United States Patent [19]
Krause et al.

[11] Patent Number: 5,182,685
[45] Date of Patent: Jan. 26, 1993

[54] STEPPER MOTOR TORQUE VARIANCE COMPENSATION USING VARIED APPLIED VOLTAGE

[75] Inventors: James N. Krause; Brian P. Tremaine; Litko R. Chan, all of Santa Clara County, Calif.

[73] Assignee: Seagate Technology, Inc., Scotts Valley, Calif.

[21] Appl. No.: 306,534

[22] Filed: Feb. 3, 1989

[51] Int. Cl.⁵ .................................................. G11B 5/55
[52] U.S. Cl. .................................... 360/78.13; 318/685
[58] Field of Search ......... 360/75, 78.04, 78.06–78.08, 360/78.13, 77.02–77.11; 318/561, 685, 696

[56] References Cited

U.S. PATENT DOCUMENTS

| | | | |
|---|---|---|---|
| 4,591,933 | 5/1986 | Quackenbush | 360/78.06 |
| 4,622,603 | 11/1986 | Mizunuma et al. | 360/78.13 |
| 4,672,283 | 6/1987 | Kobayashi | 318/696 |
| 4,731,680 | 3/1988 | Moriyama et al. | 360/78.13 |
| 4,782,406 | 11/1988 | Shoji et al. | 360/78.13 |

*Primary Examiner*—Jerry Smith
*Assistant Examiner*—Steven R. Garland
*Attorney, Agent, or Firm*—Flehr, Hohbach, Test, Albritton & Herbert

[57] ABSTRACT

The present invention utilizes the output of a voltage regulator to control the drive voltage to the stepper motor driven transducer positioning system. This technique will significantly reduce the access time. More specifically, in this invention, the output of a digital-to-analog converter (DAC) is used to control the output voltage level of a voltage regulator circuit which supplies the voltage of the stepper motor drive transistors. In order to optimize the drive voltage output from the voltage regulator to the stepper motor for each disc drive, circuitry is provided to determine the minimum settling time for a specific actuator movement resulting from the application of a given drive voltage. A detector circuit monitors the settling time of the head over the center of the target track. The data identifying the voltage regulator output which results in minimum settling time is stored and used from then on for that stepper motor disc drive system as the optimum access tuned voltage. This data will be applied by the microprocessor to a DAC, and output from the voltage regulator to the stepper motor drivers during each stepping sequence. Typically, this tuning process is originally accomplished when the disc drive is first powered on and is part of the normal power-on recalibration routine.

13 Claims, 7 Drawing Sheets

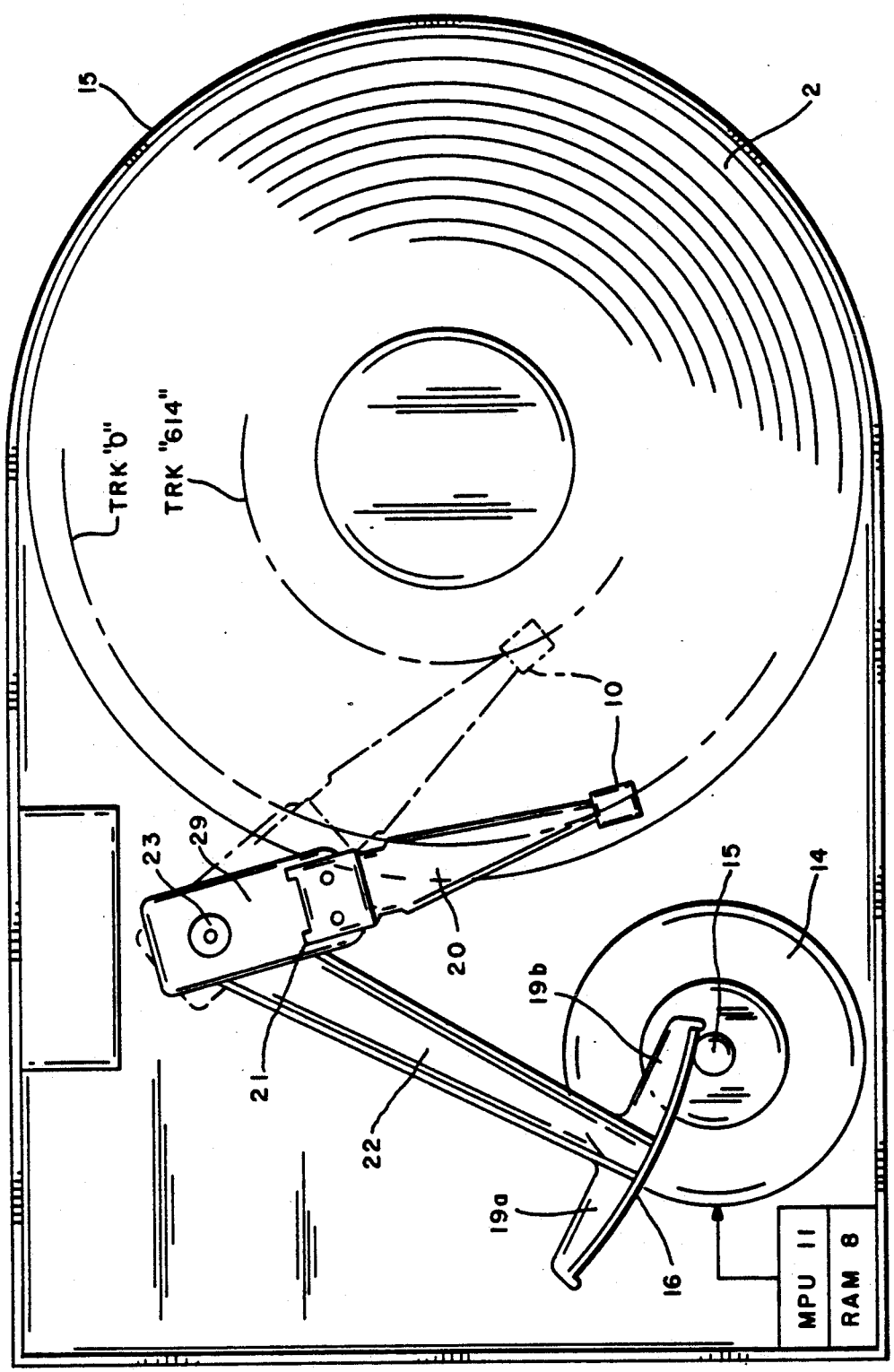
FIG.—1A

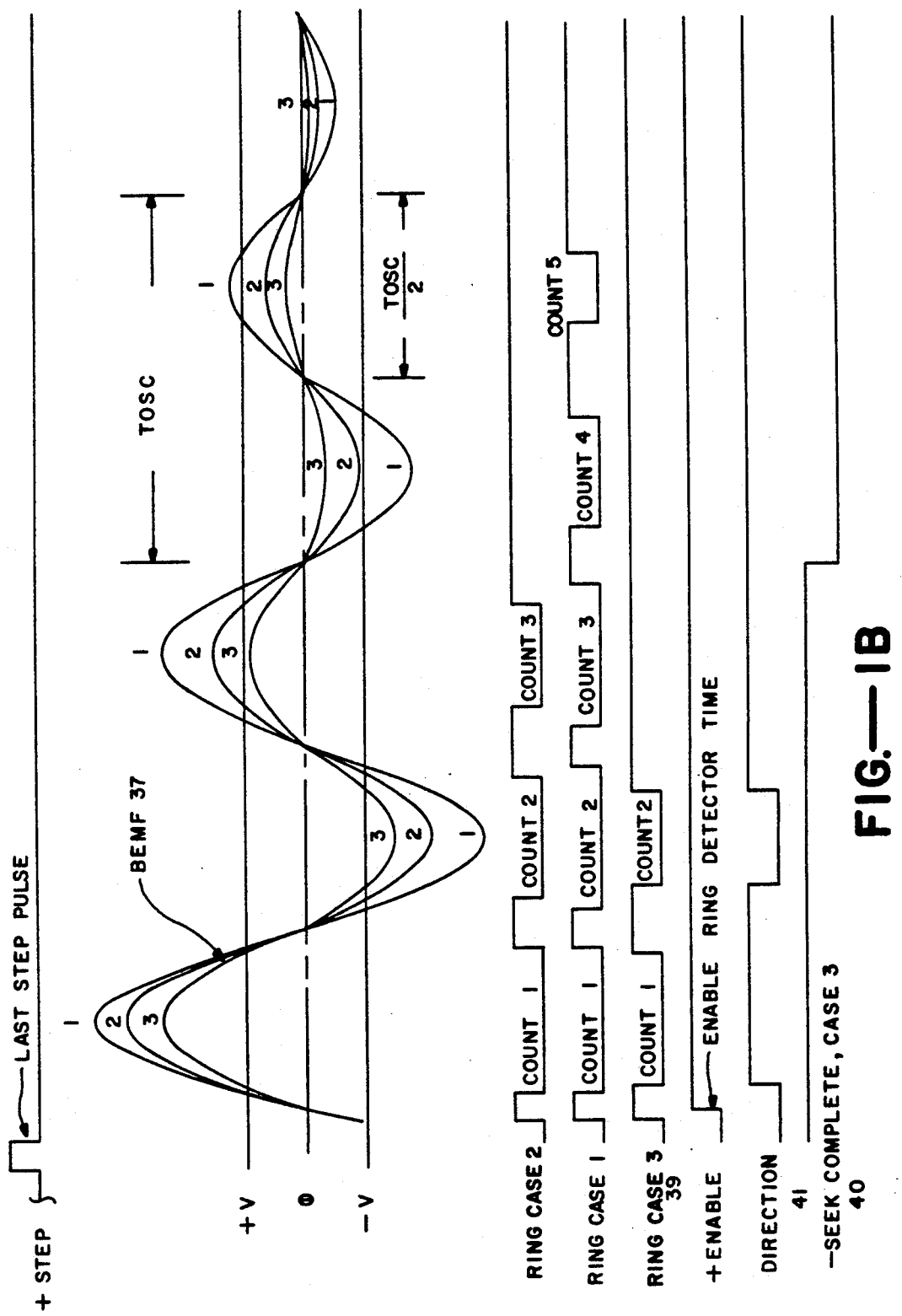
FIG.—1B

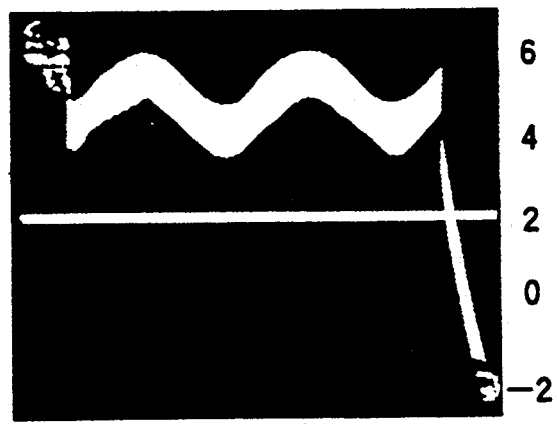
FIG.—2A
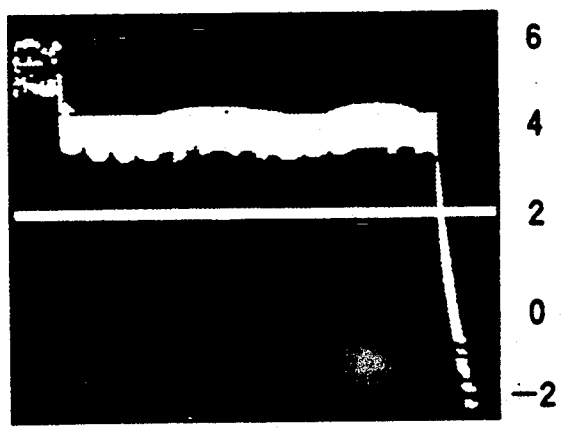
FIG.—2B
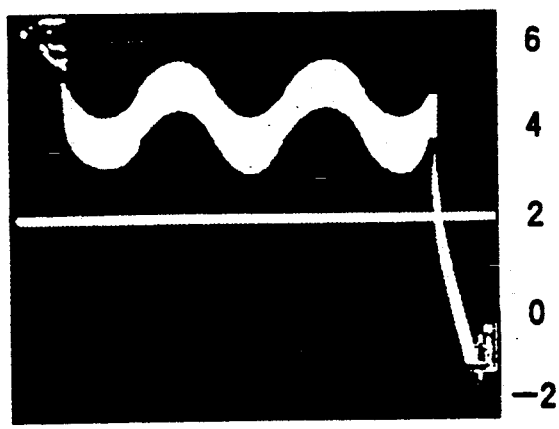
FIG.—2C

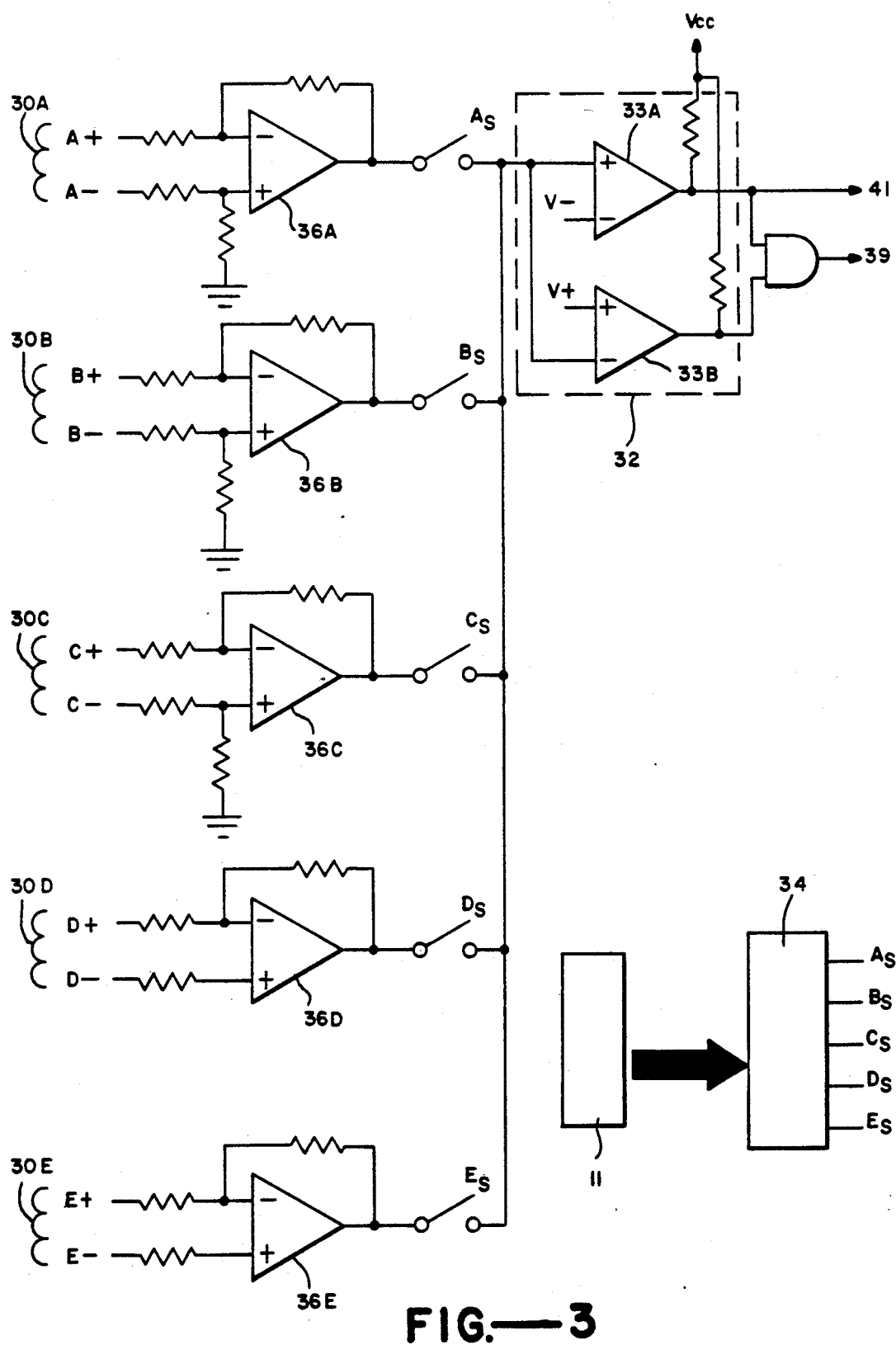
FIG.—3

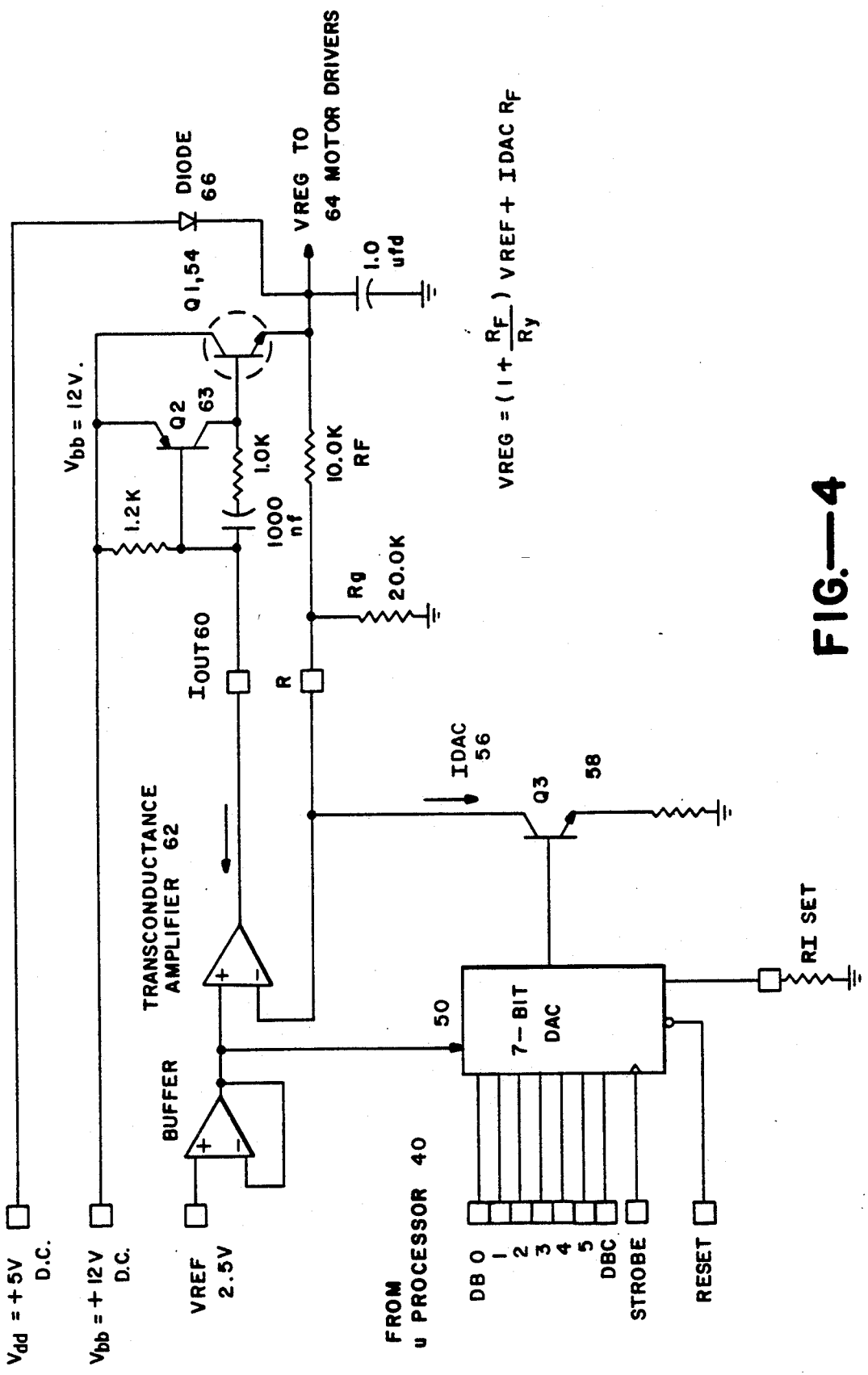
FIG.—4

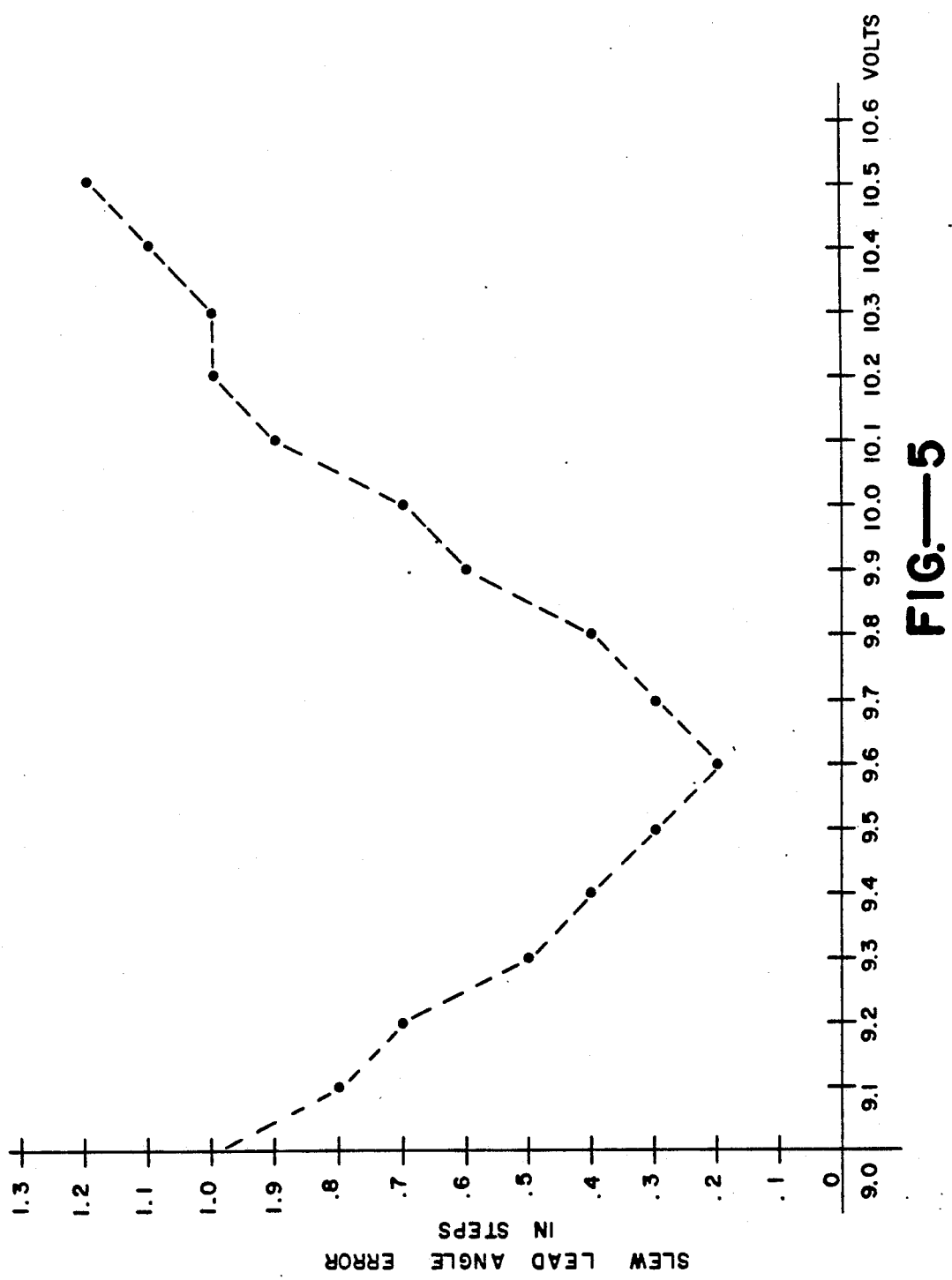

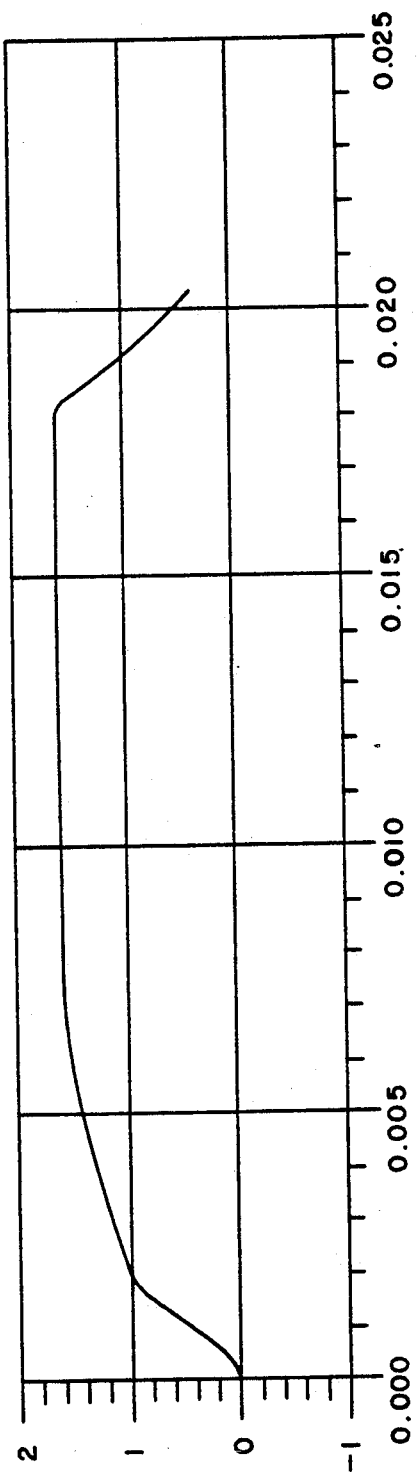
FIG.—6A
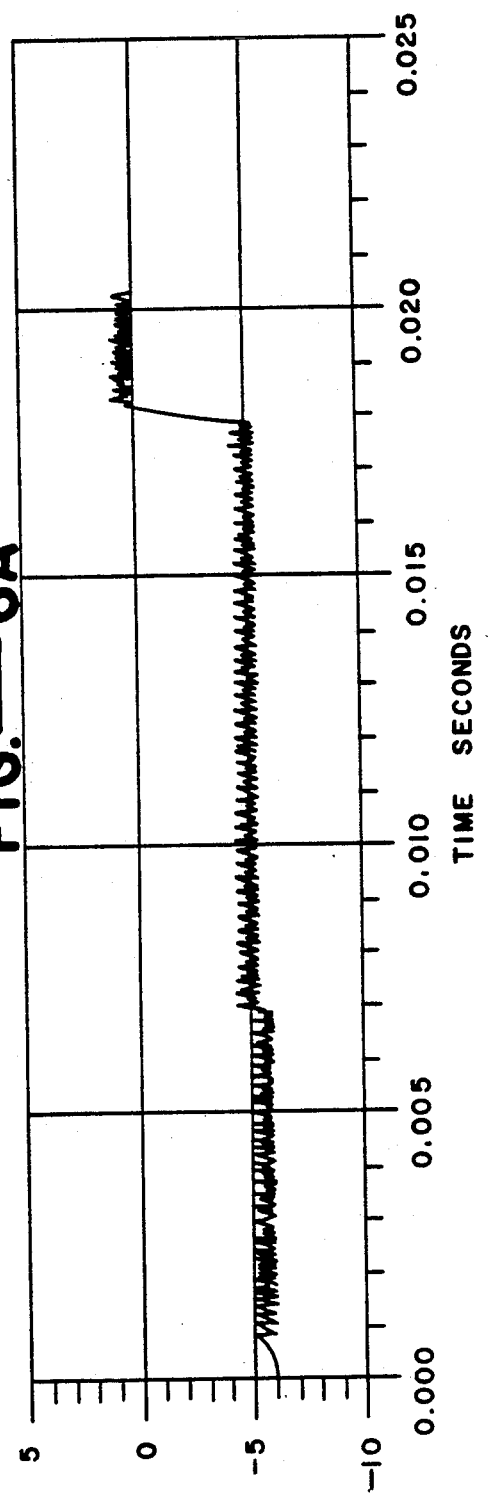
FIG.—6B

STEPPER MOTOR TORQUE VARIANCE COMPENSATION USING VARIED APPLIED VOLTAGE

FIELD OF THE INVENTION

The invention relates generally to a method for controlling the position of a stepper motor controlled actuator, and more particularly to a method of reducing the time to finally position a transducer over a target track in a disc drive by controlling the applied voltage to the stepper motor.

BACKGROUND OF THE INVENTION

It is generally desirable to maximize the amount of data which can be stored on an information storage disc. Data is generally stored on a disc on concentric circular tracks. Obviously, it is desirable to fit as many tracks as possible on the disc surface, which means that the track should be as narrow as practical and as close together as practical. However, it is also necessary to position a transducer over the middle of any desired track, and to move it there as rapidly as possible from another track each time the data is to be accessed on the disc. As the tracks become ever narrower and are spaced closer and closer together, it becomes increasingly difficult to rapidly and reliably position the transducer. It is the ability to rapidly and reliably position the transducer over the center of a desired or target track while the disc is rotating, which limits the access time of the recording disc, access time being an extremely significant factor in the useability of any disc drive.

With magnetic storage discs, typically an open loop positioning system with no feedback control is used to coarse-position either one or an array of read/write transducers over a desired cylinder/track. With a flexible magnetic storage disc, this typically has been the only positioning system for the transducer. With hard magnetic storage discs, open-loop coarse-positioning is generally followed by closed-loop positioning using a positioning system with feedback control to precisely position the transducer over the center of the desired track. The closed-loop positioning system generally locks onto and follows a magnetic pattern of some kind recorded on a portion of each track. Most of these magnetic servo schemes use a significant portion of the recording surface for a magnetic servo pattern. Obviously, this reduces the amount of recording surface available for recorded data.

Thus, an objective of this invention is to reduce the access time to a given target track without the use of a closed-loop servo system. More particularly, an objective is to provide a disc drive with low access times without sacrificing disc surface space to servo data storage.

It is another objective herein to provide a simply-implemented system which can reduce the time necessary to accurately position a transducer over the center of the target track.

In the past, it has been identified as highly desirable in finally positioning a transducer to reduce the settling or ring-out time of the stepper motor. This is the time necessary to slow down and finally stop a transducer in its movement from one track to another. In order to achieve a reduction from about 65 milliseconds access time to below 40 milliseconds, open loop control methods were initially used wherein a minimum ring-out time was achieved by correctly timing the step input command pulses to a stepper motor. This open loop approach, however, has limited effectiveness, because motor parameters will vary due to manufacturing tolerances. Therefore, with such an invariant algorithm, the step response will not provide a minimum ring-out sequence for every motor. However, utilizing the principles of closed loop methods to minimize the step response ring-out time requires an external sensor and an extensive amount of electronics to produce the necessary feedback signal. Therefore, the problem is to reduce the settling or ring-out time of the stepper motor driven actuator without significantly increasing the overhead in software or hardware incorporated in the disc drive.

SUMMARY OF THE INVENTION

In accordance with the present invention, apparatus and method claims are described for using the output of a voltage regulator to control the drive voltage to the stepper motor driven transducer positioning system. This technique will significantly reduce the access time. More specifically, in this invention, the output of a digital-to-analog converter (DAC) is used to control the output voltage level of a voltage regulator circuit which supplies the voltage of the stepper motor drive transistors. In order to optimize the drive voltage output from the voltage regulator to the stepper motor for each disc drive, a series of seeks is performed using identical starting and target tracks. As each seek is performed, the input to the DAC is incremented by the microprocessor, causing the stepper motor drive voltage to be increased in one millivolt increments. A ring detector (which provides an output count of the number of target track crossings by the transducer before the transducer settles on the target track) monitors the settling time of the head over the center of the target track. The data identifying the voltage regulator output which results in minimum ring-out count is stored and used from then on for that stepper motor disc drive system as the optimum access tuned voltage. This data will be applied by the microprocessor to a DAC, and output from the voltage regulator to the stepper motor drivers during each stepping sequence.

Typically, this tuning process is originally accomplished when the disc drive is first powered on and is part of the normal power-on recalibration routine. The disc drive could also be retuned on command or by any other interrupt routine parameter such as time or temperature change.

Alternatively, the calculated optimum drive voltage could be stored on a non-user accessible track of the disc surface of the disc drive, and automatically accessed as part of the power-on routine for the disc drive. A complete disclosure of this approach can be found in U.S. Pat. No. 4,746,998, issued May 24, 1988, incorporated herein by reference. In this way, the time to accomplish the tuning routine at power-on is minimized.

The features and advantages of the present invention will be better understood by the description which follows of a preferred embodiment given with respect to the following figures.

BRIEF DESCRIPTION OF THE DRAWINGS

FIG. 1A illustrates a typical stepper motor driven disc drive with which the present invention is useful;

FIG. 1B illustrates the typical response time in settling a transducer over a target track in such a disc drive;

FIGS. 2A, 2B, and 2C use a phase plane technique for illustrating the lead and lag error which occurs in driving a stepper motor with voltages which are greater or less than the optimum voltage as well as the improved results achieved by this invention using the optimum voltage;

FIG. 3 illustrates the structure of a ring detector which may be used to monitor the settling sequence of a transducer over a target track;

FIG. 4 illustrates a voltage regulator and DAC which are especially useful in implementing the present invention;

FIG. 5 is a graph of stepper motor lead angle error versus applied driver voltage which is the result of applying a sequence of drive voltages to the disc drive stepper motor and monitoring the slew lead single error for each of those drive voltages; and FIGS. 6A and 6B illustrate the normal sequence of accelerate slew and decelerate which occurs as a transducer is moved from track to track when a new track is accessed in a disc drive.

DETAILED DESCRIPTION OF A PREFERRED EMBODIMENT

A typical disc drive with which this invention is useful is shown in FIG. 1A, and includes one or more discs 2 stacked on a spindle 4 for rotation by a spindle motor (not shown). A transducer 10 is positioned over one of the tracks for reading or writing data on a selected track. Positioning occurs under control of a stepper motor 14 in response to commands from a microprocessor 11, executing a program from up RAM 8. Rotation of the stepper motor 14 and its pulley 15 causes a band 16 which is connected from the pulley 15 to the head 19 of arm 22 to wind and unwind on the pulley 15. In response, the drive arm 22 rotates around the pivot 23 to move carriage arm 29 and the arm 20 which supports the transducer 10 from track to track.

As has been discussed above, the objective of this invention is to minimize the time spent in seeking for the correct track under control of the stepper motor 14. The time required for a SEEK sequence may be unduly lengthened if excessive ring-out caused by moving mass and inertia effects occurs at the end of the SEEK. Such excessive ring-out is the result of the stepper motor 14 not being properly controlled by the drive algorithm to land exactly on the target track.

In most circumstances, no single algorithm can be used to control the stepper motors used in mass-produced disc drives, because a stepper motor has many parameters that vary with volume production of the assembly. One of these parameters is pull-out torque. This variance of torque from motor to motor will cause a mismatch to a fixed velocity profile algorithm that is typically developed by testing a range of members of a family of motors to be installed in a given disc drive. Thus, the known and widely used velocity profile algorithms stored in the memory associated with the microprocessor 11 will not always define the most efficient available SEEK sequence to a given track, i.e. minimum SEEK time per a given length SEEK.

Further, the input voltage to a disc drive usually has a tolerance. For example, +12 volts DC is, in fact, typically specified as ±5%. Therefore, one has to compensate for these power tolerances and stepper motor variances in the accessing algorithms. By placing a voltage regulator in the stepper motor driver voltage path, the effect of power supply tolerance is automatically removed. Now if the output voltage is variable, then the drive voltage to the stepper motor 14 can be tuned for optimal performance with a given stepper motor driver system. A method of monitoring this performance must now be introduced.

A portion of the system to be used in the present invention, specifically the ring detector which detects the ring-out time period, or the time period necessary for a transducer to finally settle on a target track is disclosed in an application entitled, "Information Storage Disc Transducer Position Control System Using Last Step Damping," by Krause, Gauthier, Chan, and Tremaine, Ser. No. 226,150, filed Jul. 29, 1988, now U.S. Pat. No. 5,079,653 assigned to the assignee of this application and incorporated herein by reference. In this application, a ring detector is used to monitor the back EMF (BEMF) of an open winding to produce a velocity signal that provides a stepper motor ring-out profile. FIG. 3 of the present application illustrates the significant features of this ring detector.

As has been described above, the positioning means for the transducer 10 comprises a stepper motor 14 whose multiple phases appear in FIG. 3. These phases 30A-E are selectively energized to position the transducer 10 over any of the tracks. The head is supported on a flexure 20 adjacent the surface of the disc 2 where the transducer 20 flies on a thin film of air when the disc 2 is rotated. The spindle motor (not shown) located concentric with the spindle 4 of the disc 2 is provided to create relative movement between the disc 2 and the transducer 10, thereby enabling the transfer of data between the magnetic storage medium and the transducer 10 in a conventional manner.

When the transducer 10 is being moved in a SEEK mode from one track to a desired target track, the microprocessor 11 continuously calculates the position of the moving transducer 10 relative to the target track. When the target track is reached by the transducer 10, the output of the ring detector 32 shown in FIG. 3 is monitored to determine how much ringing exists. The predetermined algorithm is used to finally position the transducer relative to the target track.

The specific positioning of the transducer 10 relative to a selected track is well known in this technology, and is explained fully in the above-incorporated application. In the typical stepper motor described in this application, the stepper motor has 10 poles each wound with a coil. The coils of opposing poles are wired together in series and illustrated by the coils 30A-30E of FIG. 3. A ring detector 32 is shown selectively connected to the output of any of the coils in response to commands through a selector 34 from the microprocessor 11. A separate amplifier 36 is provided for each winding pair 30A-30E, connected across the two outputs of the series-connected coils. The output of each amplifier 36A-36E is multiplexed to the ring detector 32 which functions as a window comparator. The microprocessor 11 keeps account of which track the stepper is arriving at, and selects an amplifier 36A-36E connected to a non-energized winding. In this way, the BEMF signal which appears in the non-energized winding may be monitored; this signal is a lightly-damped sinusoid, the amplitude of which is proportional to head velocity as can be seen in FIG. 1B. This signal profile provides the information about how fast and how often the transducer is going through the target track centerline or desired location. The information provided by this ring detector 32 allows the controlling system disclosed hereunder to count the number of ring-out cycles for a stepper motor as it settles into final position after a move command has been executed. Once this determination has been made, an optimum voltage may be selected for application to the stepper motor drive phases to minimize the number of ring-out cycles which will occur in any stepper motor positioning sequence.

In known stepper motor positioning system not using feedback, the settling time has traditionally been fixed as the maximum worst case expected time, resulting in an inordinately long time to settle at the end of any SEEK. The objective of this invention is to modify this system to minimize SEEK settling time by using the output of a modified ring detector, the ring detector indicating both the velocity at which a target track is crossed by the seeking transducer and the direction. The schematic diagram of FIG. 3 shows the signals -RING 39 and direction 41 that comprise the outputs of this ring detector 32.

As shown in this diagram of FIG. 3, a ring detector 32 is selectively connected to the output of any of the stepper motor coils in response to commands through a selector 34 from the microprocessor 11. The detector 32 takes the BEMF signal 37 (as shown at the top of FIG. 1B) from a selected, i.e. non-energized coil of the stepper motor, and applies it to an input of each of a pair of operational amplifiers 33a, 33b. The other input receives a threshold level bias voltage $+V$, $-V$, set to represent a specified level of off-track, e.g. $\pm 5\%$. The ring detector 32, which has a binary output, will switch output levels when the BEMF signal is between the voltage levels $+V$, $-V$ and passes sufficiently rapidly from one threshold to the other (see the digitized representations of the BEMF signal shown in the lower portion of FIG. 1B). The assumption being made in analyzing the ring detector output is that the slope of velocity profile or BEMF directly represents the speed at which the transducer 10 passed over the target track, and therefore the amount of mistracking. This information can be used to select an optimum voltage to be applied to the phases of the stepper motor during SEEK.

The ring detector 32 digitizes the output of the selected amplifier 36A-36E connected to a non-energized coil, and therefore carrying the desired BEMF signal during the window; that is, when the BEMF signal is within the thresholds defined by the window comparator or ring detector 32. By separating the outputs of the two amplifiers which are incorporated in the window comparator or ring detector 32, and looking only at the output of one amplifier, the direction signal 41 is developed which indicates which direction the transducer 10 is moving as it crosses the target track.

The microprocessor 11 monitors the comparator output, which is shown as -RING 39 for each of the BEMF signals 37 in FIG. 1, and sets the SEEK COMPLETE signals 40 when the BEMF signal stays within the window defined by the ring detector 32 for more than one-half cycle of oscillation. This allows the SEEK COMPLETE 40 signal to be set as soon as the transducer has settled over the target track.

The discussion below will further demonstrate how the present invention utilizes and analyzes this same BEMF information to select a drive voltage for the stepper motor during its movement from an initial track to a target track to reduce the stepper settling time.

As discussed above, the window comparator 32 monitors on open winding for the level of BEMF, and is enabled just after the last step pulse 51 in an accessing algorithm sequence. In FIG. 1B, several BEMF waveforms 37 are shown. As can be seen from these BEMF curves, the ring detect output 39 for each of the three cases numbered 1, 2, and 3 is different. It can be further observed that each half cycle of BEMF ring-out produces an output from the ring detect circuit -RING 39. The actual number of rings can now be counted by the microprocessor 11 that is monitoring the signal -RING 39 for case number 1, 2, or 3. As is shown in case 1, there are five ring counts, and in case 2, there are three ring counts, and in case 3, there are two ring counts which also represents the minimum ring time achieved in this particular sequence of tests. For the fastest access or move time for this move, case 3 would be optimal because it has the lowest ring count, and therefore the fastest settling time for the transducer 10 onto the target track.

Another method of calculating the minimum access time would be to calculate the minimum ring time in total. This could be accomplished by starting a timer in the microprocessor 11 at the start of the movement from the initial track or at the occurrence of the last step pulse 51, and stopping the timer at the last -RING 39 transition.

By observing FIGS. 2A-2C, the source of these differing ring-out times shown by the BEMF curves 37 and the -RING count pulses 39 is observed. With three different driver voltages, three different slew ripple errors are detected. The curves of FIGS. 2A, 2B and 2C show actual measurements of lead angle error using a phase plane technique, with the brief left-hand portion indicating a portion of the acceleration period, the major portion of the display illustrating the slew time (i.e. the period of constant track-to-track stepping), and then finally the deceleration to the target track. The abscissa of each of these graphs in FIGS. 2A, 2B, and 2C is the position error in steps, with zero representing zero steps lead. In FIG. 2A, the input voltage to the phases of the motor, is 9.0 volts. It can be seen that this has an undershoot entering slew. In FIG. 2B, the input voltage to the stepper motor driver, is 9.6 volts with no error entering slew. In FIG. 2C, the input voltage to the stepper motor driver is 10.2 volts with an overshoot-entering slew. Thus, it can be seen that with three different driver voltages to the stepper motor, three different slew ripple errors are detected. These slew ripple errors for a given fixed access algorithm directly cause a phase mismatch at the last decelerate step, except in the case where the stepper motor voltage is idealized. This mismatch will de-tune the access stepper motor system from the predefined algorithm which is used to finally position the head over the track, and result in stepper motor ring-out. This ring-out will inevitably be added to the total access time to move the transducer to the desired target track, thus increasing the total access time.

As noted above, FIGS. 2A, 2B, and 2C are time versus motor lead in steps. The exemplary motor is a ten-phase stepping motor. The nominal lead of fixed steps is applied to the motor to start an accelerate sequence. FIG. 2A demonstrates a low torque condition by supplying low voltage to the stepper motor drivers. In this particular instance, the input is 9.0 volts. This results in a loss of one step to the nominal six-step lead at the switch point of acceleration to slew. As is seen in FIG.

2A, the slew portion of the move has an error of about one step periodic at near 140 HZ. The introduced error directly causes varying ring-outs at the end of the move, because there will be a left-over velocity error at the last step. In this condition, an overshoot or undershoot arrival will usually result, depending on the length (i.e., number of steps) of the move. This varying and unpredictable result is unacceptable as it has a significant negative impact on access time.

FIG. 2C also illustrates a similar lead problem, but in this case, an overshoot entering slew velocity is produced. This results in the same last step error condition as in FIG. 2A. The actual applied voltage in FIG. 2C Was 10.2 volts to the stepper motor driver.

FIG. 2B represents the optimal condition of acceleration, matching the six-phase lead up to slew, and then entering slew velocity at the correct lead, producing an in-phase slew no matter how many steps are executed. The end result of the in-phase slew velocity is that the last slew step will always be in correct phase to enter the deceleration part of the access or move profile for a no ring-out or a minimum ring-out last step performance. This will result in minimum access time. In this particular instance, a voltage of 9.6 volts was applied to the stepper motor driver.

FIG. 5 is a plot of lead angle versus applied voltage to the stepper motor drivers using a fixed open-loop access algorithm. The voltage is applied in a sequence of incremental steps with a different input voltage to the driver being maintained for an entire access step sequence. It can be seen that different lead angle errors result for different applied input voltages to the stepper motor drivers, and that a minimum error in lead angle can be achieved by tuning the motor input drive voltage. In this specific instance, the selected voltage of 9.6 volts represents the ideal stepper motor driver voltage, and is consistent with the representation in FIG. 2B.

It has already been discussed with reference to FIG. 1 that the ring-out count from a ring detector 32 can be used to measure the quality of an access or stepper motor move by counting the number of ring-out pulses from the ring detector circuit 32 This circuit is digitizing the output of an amplifier which has a selected open winding on its input. The open winding selection is done by the microprocessor 40 on the basis of the number of phases used to position and hold the transducer 10 at a given track.

By repeating the access sequence for a number of different input drive voltages to a stepper motor driver, the ideal input voltage for any motor in a given disc drive can be optimally selected by recording and analyzing the ring-out data as discussed with respect to FIG. 5. Ideally, the algorithm for selecting the ideal motor drive voltage for a motor in a given disc drive will be stored in read-only memory or on non-user-accessible tracks of the disc drive (as disclosed in the referenced Robinson application), and accessed at disc drive start-up, or whenever operating conditions for the drive change significantly. A given track will be selected, and a minimum sequence of two different SEEK or MOVE lengths will be used (i.e. repeated for different applied stepper motor voltages) for determining the optimum motor voltage 10-phase stepper motor only as seen in FIGS. 2A and 2C. Since the peaks of slew ripple are 60 steps apart in the 10-phase stepper motor which is the subject of this example, the two seek lengths chosen will typically be 240 and 300 steps for an 820-step maximum access disc drive. Different input voltages, for example, 1/10th volt apart will be applied, and the lead angle error measured. The drive voltage selected for a given motor will then be stored for use by the microprocessor 11 for each SEEK until the calibration process is repeated.

The graphs of FIGS. 6A and 6B illustrate the complete SEEK which is being carried out using the present invention, including the phases of accelerate, slew, and decelerate to the target track.

The circuit of FIG. 4 is one example of an optimally-designed voltage regulator controlled by a 7-bit DAC 50 interfaced to the microprocessor 11. This microprocessor 11 accesses the optimizing algorithm and applies a sequence of voltages through the DAC 50 and the voltage regulator to the motor drivers in order to select the optimum drive voltage for the disc drive stepper motor. A 12-volt DC supply 52 is the input power supply to the regulator, and transistor Q1 54 is the current supplying transistor for motor power. Manipulating the DAC input varies $I_{DAC}$ 56 through transistor Q3 58, which controls $I_{OUT}$ 60 through the transconductance amplifier 62. This combination varies the bias to transistor Q2 63, which produces the regulated voltage at the emitter of transistor Q1 54. An output range of +9.0 to +10.2 volts at $V_{REG}$ 63 was chosen in the example as shown in FIGS. 2A, 2B, 2C, and FIG. 5. In the particular example illustrated in FIG. 2, +9.6 volts proved to be the optimum voltage as is clearly demonstrated in FIG. 5. However, for another stepper motor system, a different voltage would probably result. Thus, as discussed above, the voltage selection algorithm causes the microprocessor to increment the input to the DAC 50 in one millivolt steps from 9.0 volts to 10.2 volts. For each increment, the signal -RING 39 and the number of counts in that signal is stored in the microprocessor 40. The sequence of modifying the input voltage and counting the number of rings appearing in the signal -RING 39 is repeated for at least two SEEK lengths that are multiples of 60, e.g. 240 and 300 steps. The -RING 39 count data for all the voltages and both SEEK length is compared by microprocessor 11, and the minimum ring-out count is selected. This identifies the input drive voltage to be stored in the microprocessor 11 memory 8, and used from that time on for the stepper motor system as the optimum access tuned voltage. It will be applied by microprocessor 11 to DAC 50, and output at $V_{REG}$ 63 to stepper motor drivers during the SEEK sequence.

As noted above, the tuning process is originally accomplished when the disc drive is first powered on and is part of the normal power-on recalibration routine. The disc drive can also be retuned by command or by any interrupt routine parameter such as time or temperature change. The tuning routine in the above example requires three seconds in a typical disc drive application.

It should also be noted that a low power condition to the stepper motor drivers can be accomplished by the microprocessor 11.inputting a zero to DAC 50, thus setting $V_{REG}$ 64 output to 0.0 volts. Diode 66 to the lower +5 volt DC supply will now be forward biased, and supply current to the step drivers. This will reduce stepper motor power by at least one half, depending on motor resistance and series resistance, resulting in a considerable efficiency in the supply of the necessary current to the stepper motor drivers. Other alternatives to the present invention will occur to a person of skill in the art. For example, the algorithm and, in fact, the tuned voltage selected by the first use of the algorithm, may be stored on non-user accessible tracks on the disc drive, and rapidly accessed at motor start-up to minimize the time between when the disc drive is turned on and when it is fully available for use.

The scope of the present invention is to be limited only by the following claims.

What is claimed is:

1. In a disc drive system comprising at least one constantly rotating disc for storing data on concentric tracks, means for rotatably supporting said disc, an actuator for supporting a transducer over said disc for reading and writing digital information on said disc tracks, positioning means coupled to said actuator for selectively positioning said transducer in alignment with one of said disc tracks as a target track on said rotating disc for reading and writing data, said positioning means comprising a multi-phase stepper motor for moving said actuator and thereby said transducer from an initial disc track to said target track, and voltage control means having outputs connected to the phases of said stepper motor, said voltage control means including:

means for deriving and selecting an optimum voltage to be applied to drive transistors associated with energized phases of the motor; the means for deriving and selecting the optimum voltage derives and selects the optimum voltage on command to compensate for aging, temperature and general wear of the disc drive system then existing;

means for applying different voltages to said phases of said stepper motor, measuring a settling time of said motor to each said voltage, and selecting the voltage which provides the shortest settling time as the optimum voltage; and microprocessor means for analyzing the response of said stepper motor to a voltage applied to the phases of said stepper motor, and means responsive to said microprocessor for applying said optimum voltage to the stepper motor phases.

2. A disc drive as claimed in claim 1 wherein said voltages applied to the phases of said stepper motor are applied in successive incremental steps to said stepper motor phases, the disc drive including computing means for computing the settling time of said stepper motor for each of the incremental voltages, and selection means responsive to said computing means for selecting the optimum voltage to apply to said motor phases and applying said optimum voltage during each seek to said target track.

3. A disc drive as claimed in claim 2 wherein the computing means for computing the settling time comprise a ring detector selectively connected by said computing means to an open winding at said target track to monitor the back emf of said open winding when said transducer is positioned over said target track, said ring detector producing a velocity output signal that provides a ring-out profile of said stepper motor, for selecting the optimum voltage which provides the minimum number of ring-out cycles in any stepper motor positioning sequence.

4. A disc drive as claimed in claim 3 wherein said ring detector includes threshold means for establishing thresholds relative to both directions of movement about said target track, and detector means for counting how fast and how often the transducer passes said target track in response to each said voltage applied to said stepper motor phases, to count the ring-out cycles of said stepper motor before settling into a final position at said target track.

5. A disc drive as claimed in claim 4 including a random access memory for storing optimum voltage resulting in a minimum number of ring-out cycles, whereby the optimum voltage is applied to the stepper motor for movement of the transducer to the target track.

6. In a disc drive system comprising at least one constantly rotating disc for storing data on concentric tracks, a method for rapidly positioning a transducer in response to a stepper motor over a constantly rotating disc, comprising the steps of selectively activating the multiple phases of a multiphase stepper motor for moving said transducer from an initial track to a target track, and controlling voltages connected to the phases of said stepper motor for energizing the phases of the stepper motor, monitoring the settling time of the motor by detecting the number of target track crossings by the transducer before the transducer settles on the target track, selecting an optimum voltage having the shortest settling time based on at least two monitored SEEKs to said target track with said disc drive and motor, and applying said optimum voltage to drive transistors associated with energized phases of the motor.

7. A method for rapidly positioning a transducer in response to a stepper motor over a constantly rotating disc as recited in claim 6, wherein the step of controlling voltages comprises analyzing the response of said stepper motor to a voltage applied for a SEEK of a known length, and applying said optimum voltage to the stepper motor phases through a digital-to-analog converter as a function of the unique characteristics of the stepper motor.

8. A method for rapidly positioning a transducer in response to a stepper motor over a constantly disc as recited in claim 6 wherein the step of conducting at least two monitored SEEKs includes applying different voltages to said phases of said stepper motor, measuring the settling time of said motor to each said voltage, and selecting as a motor drive voltage the voltage providing the shortest of said settling times in moving said transducer to said target track.

9. A method for rapidly positioning a transducer in response to a stepper motor over a constantly rotating disc as recited in claim 6 wherein the step of conducting at least two monitored SEEKs includes applying voltages in successive incremental steps to said stepper motor phases, computing the settling time of said stepper motor for each of the incremental voltages, selecting the optimum voltage to apply to said motor phases, storing said selected optimum voltage, and applying said voltage during each seek to said target track.

10. A method for rapidly positioning a transducer in response to a stepper motor over a constantly rotating disc as recited in claim 9, wherein the step of computing the settling time of said stepper motor includes selectively connecting a ring detector to an open winding to monitor the back emf of said open winding when said transducer is positioned over said target track, counting the number of ring-out cycles of said stepper motor before settling into a final position at said target track, and selecting the optimum voltage applied to the stepper motor resulting in a minimum number of ring-out cycles.

11. A method for rapidly positioning a transducer in response to a stepper motor over a constantly rotating disc as recited in claim 10, wherein the step of computing the settling time of the stepper motor further includes establishing thresholds relative to both directions of movement of said transducer about said target track, counting how fast and how often the transducer passes said target track in response to each said voltage applied to the stepper motor by counting the number of times each threshold is reached, and counting the number of ring-out cycles of the stepper motor before settling into a final position at said target track to determine said optimum voltage.

12. A method for rapidly positioning a transducer in response to a stepper motor over a constantly rotating disc as recited in claim 11, wherein the step of determining said optimum voltage further includes storing said optimum voltage resulting in a minimum number of ring-out cycles on a non-user accessible track of said disc drive, and accessing said stored optimum voltage before each move to said target track, whereby the optimum voltage is applied to the stepper motor for movement of the transducer to the target track.

13. A method for rapidly positioning a transducer in response to a stepper motor over a constantly rotating disc as recited in claim 6, wherein the step of selecting an optimum voltage further includes selecting the optimum voltage at each start-up to compensate for aging, temperature and general wear of the disc drive system.

* * * * *